(12) United States Patent
Calas (10) Patent No.: US 12,285,833 B2
(45) Date of Patent: Apr. 29, 2025

(54) MULTIAXIAL MACHINING CENTER WITH CONTROLLED-PRESSURE CONNECTION MECHANISM

(71) Applicant: THIBAUT, Vire (FR)

(72) Inventor: Robert Calas, Naves (FR)

(73) Assignee: THIBAUT, Vire (FR)

( * ) Notice: Subject to any disclaimer, the term of this patent is extended or adjusted under 35 U.S.C. 154(b) by 799 days.

(21) Appl. No.: 17/620,098

(22) PCT Filed: Jun. 18, 2020

(86) PCT No.: PCT/FR2020/051061
§ 371 (c)(1),
(2) Date: Dec. 16, 2021

(87) PCT Pub. No.: WO2020/254768
PCT Pub. Date: Dec. 24, 2020

(65) Prior Publication Data
US 2022/0241923 A1 Aug. 4, 2022

(30) Foreign Application Priority Data

Jun. 21, 2019 (FR) ...................................... 19 06733

(51) Int. Cl.
*B23Q 15/16* (2006.01)
*B23Q 5/40* (2006.01)
(Continued)

(52) U.S. Cl.
CPC .............. *B23Q 15/16* (2013.01); *B23Q 5/40* (2013.01); *B23Q 11/04* (2013.01); *B23Q 15/12* (2013.01);
(Continued)

(58) Field of Classification Search
CPC .......... B23Q 15/16; B23Q 5/40; B23Q 11/04; B23Q 15/12; B23Q 17/0952;
(Continued)

(56) References Cited

U.S. PATENT DOCUMENTS

| 5,126,645 A | 6/1992 | Yoshimi et al. |
| 2016/0068793 A1* | 3/2016 | Maggiore .............. C12M 41/12 901/22 |

FOREIGN PATENT DOCUMENTS

| CN | 108481132 | 9/2018 |
| DE | 7913612 | 1/1980 |

(Continued)

OTHER PUBLICATIONS

International Search Report dated Nov. 11, 2020.

*Primary Examiner* — Michael J Brown
(74) *Attorney, Agent, or Firm* — IPSILON USA, LLP (57) ABSTRACT

The invention relates to a multiaxial machining center (30) for machining a part (35), comprising:
a support plate for supporting a part (35) to be machined,
a positioning carriage (36) that can be moved with respect to the support plate along at least one first axis of movement,
a machining carriage (32) that can be moved with respect to the positioning carriage (36) along a second axis of movement perpendicular to said at least one first axis of movement,
a connection mechanism between the machining carriage and the positioning carriage, which connection mechanism is configured to guide and move in translation the machining carriage,
the connection mechanism furthermore comprising:
a system for applying a predetermined force to the machining carriage (32) along the second axis of movement, (Continued)

a unit for controlling the force applied to the machining carriage (32) by the application system.

11 Claims, 4 Drawing Sheets

(51) Int. Cl.
| | |
|---|---|
| *B23Q 11/04* | (2006.01) |
| *B23Q 15/12* | (2006.01) |
| *B23Q 17/09* | (2006.01) |
| *F16H 25/20* | (2006.01) |
| *F16H 25/22* | (2006.01) |
| *B24B 49/16* | (2006.01) |
| *G05B 19/23* | (2006.01) |

(52) U.S. Cl.
CPC ..... *B23Q 17/0952* (2013.01); *F16H 25/2021* (2013.01); *F16H 25/2223* (2013.01); *B23Q 2717/00* (2013.01)

(58) Field of Classification Search
CPC ............. B23Q 2717/00; F16H 25/2021; F16H 25/2223; B24B 49/16; G05B 19/235
USPC ........................................................ 700/173
See application file for complete search history.

(56) References Cited

FOREIGN PATENT DOCUMENTS

| | | |
|---|---|---|
| DE | 3210214 | 9/1983 |
| DE | 3317425 | 8/1984 |
| FR | 2986172 | 8/2013 |
| JP | H0623665 | 2/1994 |

\* cited by examiner

MULTIAXIAL MACHINING CENTER WITH CONTROLLED-PRESSURE CONNECTION MECHANISM

RELATED APPLICATION

This application is a National Phase of PCT/FR2020/051061 filed on Jun. 18, 2020, which claims the benefit of priority from French Patent Application No. 19 06733, filed on Jun. 21, 2019, the entirety of which are incorporated by reference.

FIELD OF THE INVENTION

The invention relates to the field of multiaxial machining centers.

The invention is linked more particularly to "3-axis" or "4-axis" machining centers. What is meant by "3-axis" is that the tool for machining the part to be machined can be moved in translation along each of the 3 axes of a Cartesian coordinate system X, Y and Z. The machining tool can also be rotated about an axis parallel to the axis Z to realize a "4-axis" machining center.

Figure 1:
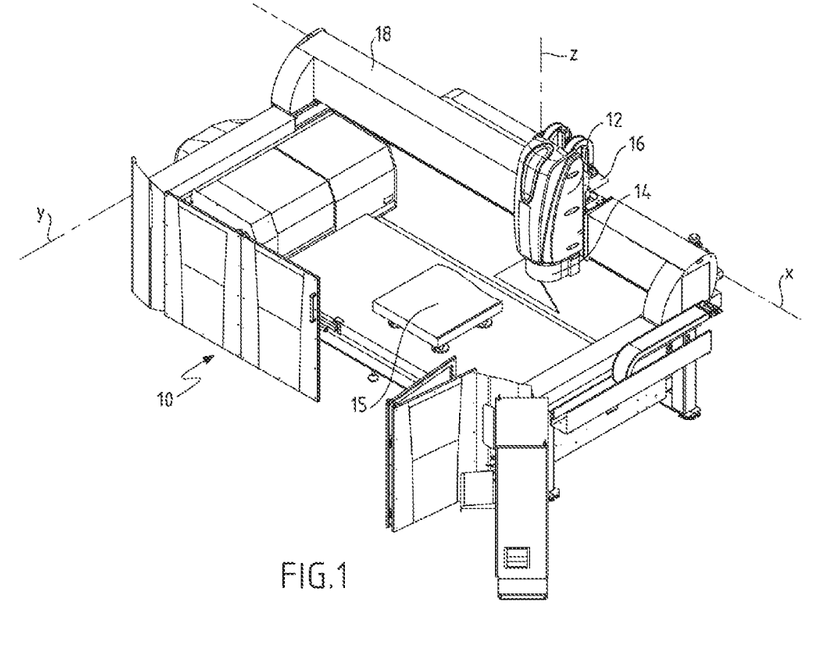
FIG. 1 shows a diagram of an overall perspective view of a machining center.

With reference to FIG. 1, an example of a machining center 10 is shown. The machining center 10 comprises a machining carriage 12 bearing a machining spindle 14 that is able to accommodate and drive in rotation a tool for machining a part 15 (not shown). In order to move the machining tool in translation, the machining carriage 12 is mounted such that it can be moved on a positioning carriage 16 along an axis Z. The positioning carriage 16 is itself mounted such that it can be moved on a gantry 18 along an axis X. Lastly, the gantry 18 is mounted such that it can be moved along the axis Y. The control of the movement of the machining tool along the three axes X, Y and Z makes it possible to machine all of the upper surface of the part 15 to a desired machining depth.

The invention is notably applicable to the polishing of materials such as granite, marble, concrete and composite materials using a digitally controlled machining center suitable for multiaxial operation. The markets targeted by this application are mainly the funeral sector, decoration, construction, etc. In the present day, materials such as granite, marble, concrete and composite materials are polished using a set of tools operating under heavy spraying (water or other lubricant). The abrasive tools used, based on synthetic silicon carbide or diamond, have a polishing surface with a diminishing particle size for increasingly fine polishing, and ideally operate at pneumatic pressure, affording a constant force on the material to be polished whatever the degree of wear of the tool may be. This force on the material to be polished, applied perpendicularly to the surface to be polished, must be adapted as a function of the hardness of the material to be polished and the particle size of the polishing surface of the abrasive tool. Precise adjustment of this force is necessary to obtain the finish required (smoothed with no traces, brilliant and uniform polishing, etc.).

DESCRIPTION OF RELATED ART

In order to meet this demand, certain manufacturers have developed a spring system for applying a force to the surface to be polished. The main drawback of this solution is the lack of consistency of the force applied. This is because the force exerted by the springs varies as a function of their compression. It decreases when the tools are worn, and consequently the force applied to the surface to be polished decreases. This causes the polishing to lack uniformity, which is highly detrimental.

Another technical solution available on the market is to obtain a pressure referred to as "electric", which is afforded by controlling the torque supplied by the axis motors or by controlling the speed of the spindle motors of the machining center. This solution affords acceptable results (in terms of polishing uniformity) but requires the use of specific spindle motors and geared motors, which can give rise to additional costs and increased risks of malfunction.

Another conceivable solution would be to use a force sensor on the tool borne by the spindle. However, this solution is very expensive and incompatible with the market price for polishing centers. In addition, this solution is bulky at the spindle and produces a further overhang at the spindle.

Figure 2:
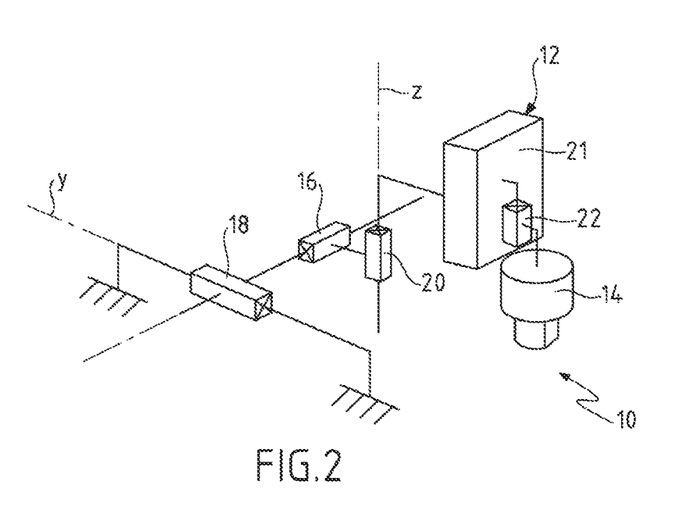
FIG. 2 shows a basic kinematic diagram of a machining center according to the prior art.

Another known solution is to add a pneumatic ram system between the body of the machining carriage 12 and the tool holding spindle 14. In this case, a further connection mechanism is disposed between the body of the machining carriage 12 and the tool holding spindle 14 for allowing the tool holding spindle 14 to be moved in translation and a given force to be applied to it along the axis Z. One exemplary embodiment of such a solution is shown in FIG. 2. It can be seen that the machining carriage 12 is mounted so as to be movable in translation with respect to the positioning carriage 16 at a sliding connection 20, and that the body 21 of the machining carriage 12 is also mounted so as to be movable in translation with respect to the tool holding spindle 14 at a further sliding connection 22.

The drawback of the latter solution is that it is complex to implement because it requires the addition of a further sliding connection 22 between two subassemblies which are mounted rigidly in relation to one another. The design of the machining carriage 12 therefore needs to be readjusted. This necessitates an increase in the number of parts to be used in order to realize the movable interface between the body 21 and the tool holding spindle 14, this increasing the manufacturing cost of such a solution.

Objects and Summary

There is therefore a need for a machining center that does not have these drawbacks.

To that end, the invention provides a multiaxial machining center for machining a part, comprising:
- a support plate for supporting a part to be machined,
- a positioning carriage that can be moved with respect to the support plate along at least one first axis of movement,
- a machining carriage that can be moved with respect to the positioning carriage along a second axis of movement perpendicular to said at least one first axis of movement, the machining carriage comprising a tool holding spindle configured to accommodate a machining tool and drive said machining tool in rotation about an axis of rotation parallel to the second axis of movement,
- a connection mechanism between the machining carriage and the positioning carriage, which connection mechanism is configured to guide and move in translation the machining carriage with respect to the positioning carriage along the second axis of movement, the connection mechanism furthermore comprising:
- a system for applying a predetermined force to the machining carriage along the second axis of movement, a unit for controlling the force applied to the machining carriage by the application system.

The incorporation of a system for applying a predetermined force inside the connection mechanism between the machining carriage and the positioning carriage makes it possible to supply an axial pressure at the machining tool while doing away with a further mechanical connection. This is because it is an existing mechanical connection that is improved so as to realize a further function of applying a predetermined force.

In addition, the presence of a unit for controlling the force applied affords a precise pressure at the machining tool that can be adjusted as a function of the wear of the machining tool or any other parameter requiring adjustment of the contact pressure of the machining tool on the part to be machined. The predetermined force is preferably applied continuously so as to obtain a continuous pressure throughout the period in which work is carried out on the part. In this way, for polishing or surfacing work in particular, it becomes possible to obtain a perfectly uniform surface.

This solution thus makes it possible to benefit from the application of a precise and controllable force while not requiring the addition of a further connection. The machining center is thus less expensive to manufacture, while still being very efficient as regards the machining of the part.

According to one embodiment of the machining center, the control unit is configured to control the force applied to the machining carriage as a function of the desired contact pressure between the machining tool and the part.

According to one embodiment of the machining center, the control unit is configured to control the force applied to the machining carriage as a function of the wear of the machining tool.

According to one embodiment of the machining center, the control unit comprises means for determining the wear of the machining tool, having one or more of the following: a system for measuring the wear of the machining tool, and a plurality of prerecorded data representative of the wear of the machining tool as a function of its use.

According to one embodiment of the machining center, the connection mechanism is a sliding connection between the machining carriage and the positioning carriage, said sliding connection incorporating the system for applying a predetermined force.

The sliding connection preferably comprises a slide shaft and a sliding enclosure, which is configured to be moved along this slide shaft. The machining carriage is mounted on the sliding enclosure and the slide shaft is mounted on the positioning carriage. The guide enclosure incorporates the system for applying predetermined force.

According to one embodiment of the machining center, the connection mechanism is configured to allow an additional axial displacement along the second axis of movement for the application system to apply the predetermined force.

According to one embodiment of the machining center, the connection mechanism is a ball screw system comprising:
  a nut attached to the positioning carriage,
  a screw configured to engage with the nut, the machining carriage resting on the screw,
  a system for driving the screw in rotation so as to allow the screw and the machining carriage to move in translation with respect to the nut and to the positioning carriage.

According to one embodiment of the machining center, the system for applying the predetermined force comprises the nut of the ball screw system, the nut comprising a connecting part configured to engage with the screw and an enclosure attached to the positioning carriage, the connecting part and the enclosure being configured to be moved with respect to one another along the second axis of movement so as to produce an additional axial displacement.

According to one embodiment of the machining center, the enclosure forms a sealed chamber in which the connecting part is at least partially placed, the connecting part comprising a piston inside the chamber in such a way as to define two chamber portions on either side of the connecting part along the second axis of movement, and wherein the application system additionally comprises a force application circuit that is in fluidic communication with the two chamber portions and is configured to apply a predetermined force to the connecting part by means of a pressurized fluid circulating inside the force application circuit in order to move the connecting part in translation along the second axis of movement with respect to the enclosure.

According to one embodiment of the machining center:
  the connecting part comprises a body in which is formed a through-hole for the passage of the screw of the ball screw system, a wall of the hole forming a helical imprint configured to engage with the screw of the ball screw system, the connecting part additionally comprising an external flange configured to delimit the two portions of the chamber of the enclosure when the connecting part is disposed inside the enclosure,
  the enclosure forms a through-hole for the positioning of the connecting part and the passage of the screw of the ball screw system, the through-hole comprising a portion that extends transversely to the second axis of movement so as to form the chamber in which the external flange of the connecting part is disposed when the connecting part is disposed inside the enclosure.

According to one embodiment of the machining center, the control unit is pneumatic or hydraulic.

BRIEF DESCRIPTION OF THE DRAWINGS

The appended drawings illustrate the invention.

DESCRIPTION OF ONE OR MORE EMBODIMENTS

Figure 3:
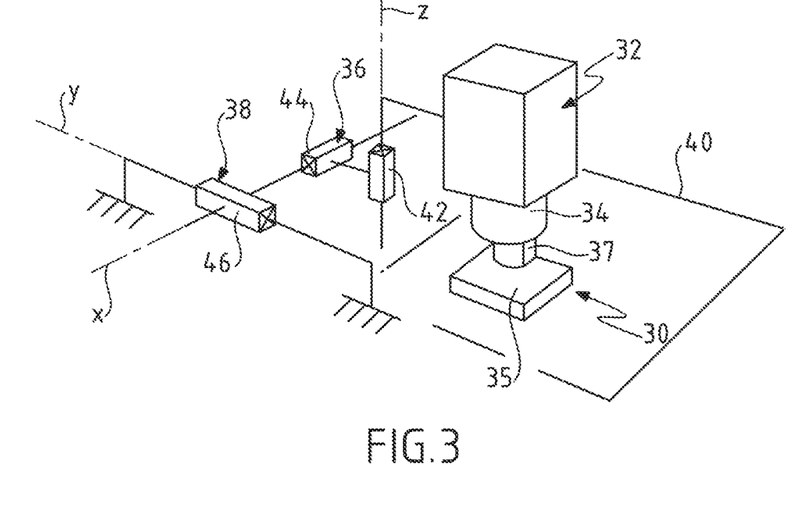
FIG. 3 shows a basic kinematic diagram of a machining center according to the invention.

With reference to FIG. 3, a machining center 30 is shown in a simplified manner. In a similar manner to the description given of the machining center 10 with reference to FIG. 1, the machining center 30 comprises a machining carriage 32 bearing a machining spindle 34 configured to accommodate and drive in rotation a tool 37 for machining a part 35. The machining center 30 is a three-axis machining center. As specified above, the machining tool can therefore be moved in translation along three axes of a Cartesian coordinate system with respect to the part 35. For the sake of clarity of the present disclosure, these three axes will be denoted the axis X, the axis Y and the axis Z. In a conventional manner, the part 35 is disposed on a support plate 40 extending along the axes X and Y. The movement of the machining tool 37 in translation along the axes X and Y thus makes it possible to position the tool at a desired location on the support plate and the movement in translation along the axis Z makes it possible to adjust the vertical position of the machining tool 37 and therefore notably the machining depth. The tool holding spindle 34 is configured to rotate the tool 37 about an axis parallel to the axis Z. The support plate 40 makes it possible to support the part 35 to be machined. The part 35 is preferably disposed on holding pads disposed between the support plate 40 and the part 35.

According to one embodiment, the machining center may also be a four-axis machining center, where the movements in translation along the axes X, Y and Z may be combined with a rotational movement along an axis of rotation C of the tool 37 parallel to the axis Z of the Cartesian coordinate system.

In order to move the machining tool in translation, the machining carriage 32 is mounted such that it can be moved on a positioning carriage 36 along the axis Z at a first sliding connection 42. The positioning carriage 36 is itself mounted such that it can be moved on a gantry 38 along the axis X at a second sliding connection 44. Lastly, the gantry 38 is mounted such that it can be moved along the axis Y at a third sliding connection 46.

The first sliding connection 42, also referred to as connection mechanism 42, is configured to guide and move in translation the machining carriage 32 with respect to the positioning carriage 36 along the axis Z.

The connection mechanism 42 comprises a system for applying a predetermined force to the machining carriage along the axis Z. This predetermined force can thus be transmitted to the part 35 via the tool 37 in the form of contact pressure. This contact pressure makes it possible to perform a more uniform machining operation of the part 35 even when the tool is worn, in particular in the case of a polishing tool. In order to allow the application system to transmit the force to the machining carriage 32, the connection mechanism 42 is preferably configured to allow an additional axial displacement along the axis Z.

Figure 4:
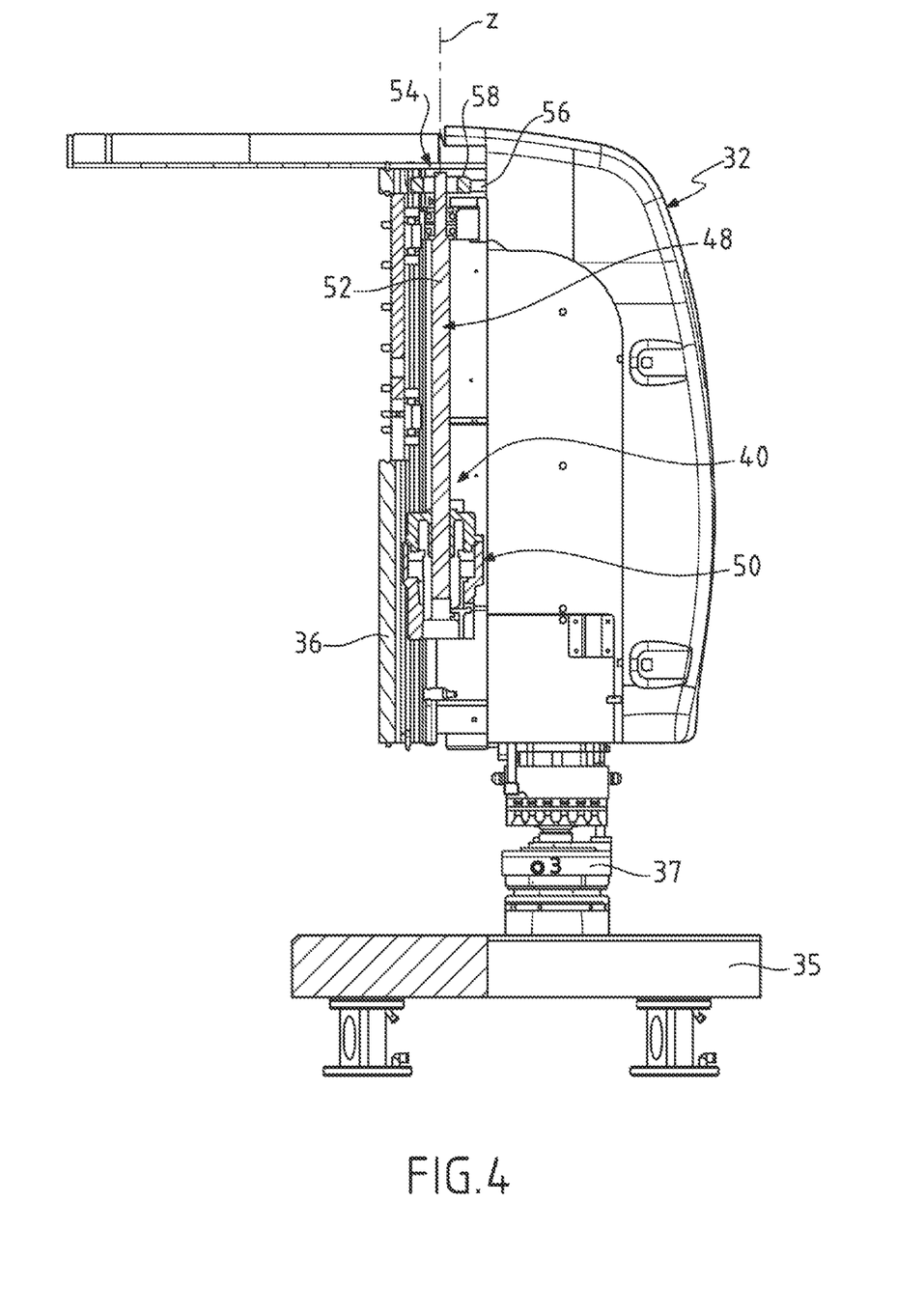
FIG. 4 shows a diagram of a sectional view of one embodiment of the machining center according to the invention.
Figure 5:
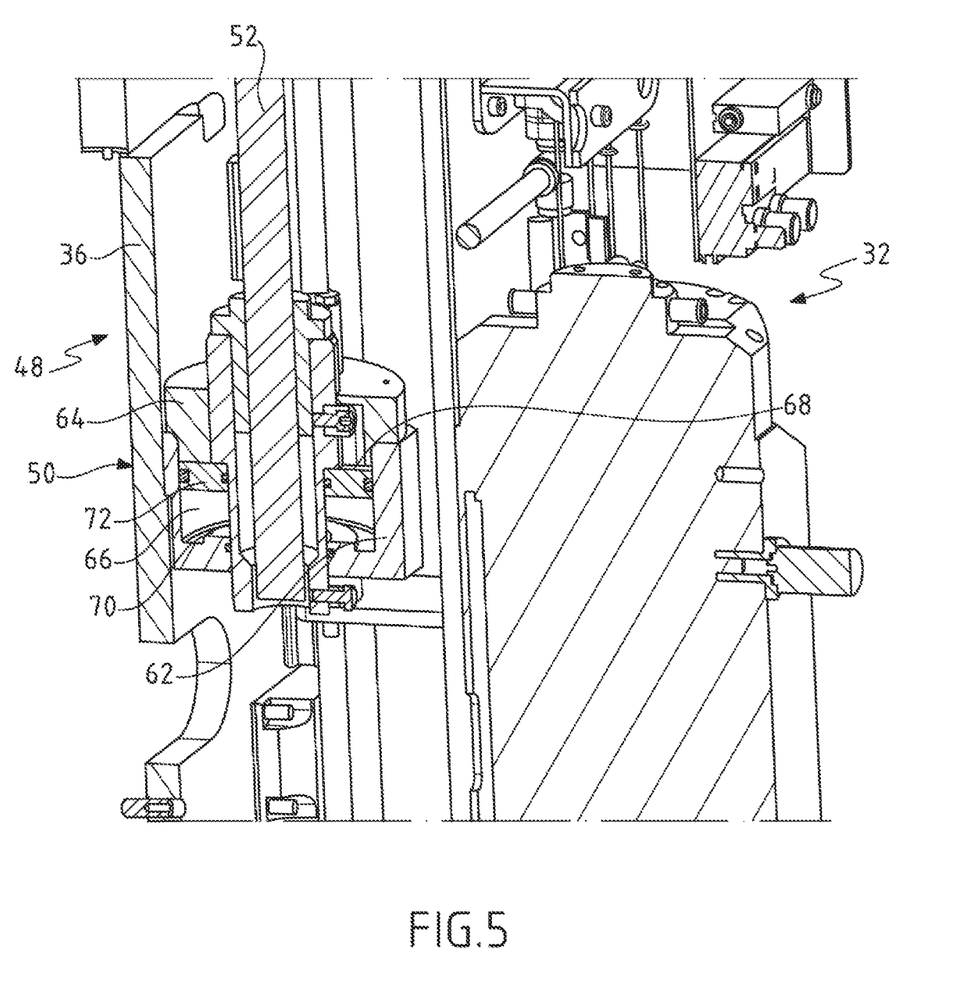
FIG. 5 shows a detailed diagram of a sectional view of a connection mechanism between a machining carriage and a positioning carriage of the machining center according to FIG. 4.

The connection mechanism 42, or first sliding connection, thus makes it possible for a single connection mechanism to perform two functions. The first function performed relates to the guidance and the movement in translation of the machining carriage 32 with respect to the positioning carriage 36 along the axis Z. The second function performed relates to the application of a predetermined force to the machining carriage 32 along the axis Z. The force application system is incorporated inside the connection mechanism 42, or sliding connection, by contrast to the prior art in which the application of force is very often a function performed by a member that is separate from the connection mechanism 42. With reference to FIGS. 4 and 5, the connection mechanism 42 is preferably a ball screw system 48 comprising a nut 50 attached to the positioning carriage 36 and a screw 52 configured to engage with the nut 50. Balls are inserted inside the nut to produce a contact surface between the screw 52 and the nut 50. The nut 50 is kept fixed with respect to the positioning carriage 36 in such a way that the rotation of the screw 52 with respect to the nut 50 causes the screw 52 to move in translation with respect to the nut 50. The machining carriage 32 rests on the screw 52 in such a way that the movement of the screw 52 in translation with respect to the nut 50 along the axis Z is transmitted to the machining carriage 32 when the screw 52 is being driven in rotation. A system 54 for driving the screw 52 in rotation allows the screw 52 and the machining carriage 32 to move in translation with respect to the nut 50 and to the positioning carriage 36. This drive system 54 comprises for example a motor (not visible) which transmits a rotational movement to the screw 52 via a belt 56 and a pulley 58.

The system for applying the predetermined force comprises the nut 50 of the ball screw system 48. The nut 50 comprises a connecting part 60 configured to engage with the screw 52 and an enclosure 62 attached to the positioning carriage 36. The connecting part 60 and the enclosure 62 are configured to be moved with respect to one another along the axis Z to produce the abovementioned additional axial displacement. In other words, the connecting part 60 and the enclosure 62 are able to slide with respect to one another. More particularly, the connecting part 60 is configured to slide inside the enclosure 62.

The degree of freedom produced between the connecting part 60 and the enclosure 62 makes it possible to apply the predetermined force inside the connection mechanism 42.

The enclosure 62 forms a sealed chamber 66 in which the connecting part 62 is at least partially placed. More particularly, the enclosure 62 comprises a cap 64 that makes it possible to close an internal cavity of the enclosure 62.

The connecting part 60 is also configured to form a piston 72 inside the chamber 66 so as to define a first chamber portion 68 and a second chamber portion 70 on either side of the connecting part 60 along the axis Z. The piston 72 is attached to the connecting part 60. The first chamber portion 68 is disposed in the upper part of the chamber 66 between the piston 72 and an upper portion of the enclosure 62, here the cover 64. The second chamber portion 70 is disposed in the lower part of the chamber 66 between the piston 72 and a lower portion of the enclosure 62.

The connecting part 60 comprises a body in which is formed a through-hole for the passage of the screw 52 of the ball screw system 48. A wall of the hole forms a helical imprint configured to engage with the screw 52 of the ball screw system 48. The connecting part 60 additionally comprises an external flange or the piston 72 configured to delimit the first portion 68 and the second portion 70 of the chamber of the enclosure 62 when the connecting part 60 is disposed inside the enclosure 62.

The enclosure 62 forms a through-hole for the positioning of the connecting part 60 and the passage of the screw 52 of the ball screw system 48. The through-hole comprises a portion that extends transversely to the axis Z so as to form the chamber 66 in which the external flange or the piston 72 of the connecting part 60 is disposed when the connecting part 60 is disposed inside the enclosure 62.

The application system furthermore comprises a force application circuit (not visible) that is in fluidic communication with the first chamber portion 68 and second chamber portion 70. In particular, a fluid passage duct opens into each of the first chamber portion 68 and second chamber portion 70 in order to introduce or withdraw a fluid. The application circuit furthermore comprises a device for circulating and pressurizing the fluid inside the application circuit in such a way as to inject or extract the fluid of the first chamber portion 68 and second chamber portion 70. This device is preferentially a pump that is in fluidic communication with the first chamber portion 68 and second chamber portion 70. The application of a pressure difference between the first chamber portion 68 and second chamber portion 70 makes it possible to move the piston 72 and transmit a predetermined force to it. This force is then transmitted to the connecting part 60, to the screw 52 and then to the machining carriage 32.

The application system thus forms a ram inside the nut 50 of the ball screw system 48, which ram is configured to transmit a predetermined force to the screw 52. The force application circuit is preferably pneumatic so as to allow the application of forces to function in a flexible manner. As an alternative, the force application circuit may be hydraulic.

The connection mechanism 42 furthermore comprises a unit for controlling the force applied to the machining carriage 32 by the application system. This control unit comprises a calculator configured to adjust the pressure inside the chamber 66 in such a way as to control the force transmitted to the machining carriage 32.

The control unit is preferably configured to control the force applied to the machining carriage 32 as a function of the desired contact pressure between the machining tool 37 and the part 35. Even more preferably, the control unit is configured to control the force applied to the machining carriage 32 as a function of the wear of the machining tool 37. The control unit may comprise means for determining the wear of the machining tool 37, having one or more of the following: a system for measuring the wear of the machining tool 37, and a plurality of prerecorded data representative of the wear of the machining tool 37 as a function of its use. The calculator of the control unit determines the force to be applied to the machining carriage 32 as a function of the level of measured or estimated wear of the machining tool 37.

The ram thus formed by the force application system may have a single or double effect depending on the control desired. In the case of a single-effect function, a return system, for example of the spring type, is disposed in the first chamber portion 68 and the force is transmitted by applying a pressure to the fluid inside the second chamber portion 70 for overcoming the return force of the spring. In the case of a double-effect function, a pressure difference between the first chamber portion 68 and second chamber portion 70 is produced in order to move the piston 72 in one direction or the other. The pressure level of the fluid inside the second chamber portion 70 makes it possible to control the force applied to the machining carriage 32 and therefore the contact pressure applied to the part 35.

The invention claimed is:

1. A multiaxial machining center for machining a part, comprising:
    a support plate for supporting a part to be machined,
    a positioning carriage that can be moved with respect to the support plate along at least one first axis of movement,
    a machining carriage that can be moved with respect to the positioning carriage along a second axis of movement perpendicular to said at least one first axis of movement, the machining carriage comprising a tool holding spindle (34) configured to accommodate a machining tool and drive said machining tool in rotation about an axis of rotation parallel to the second axis of movement,
    a connection mechanism between the machining carriage and the positioning carriage, which connection mechanism is configured to guide and move in translation the machining carriage with respect to the positioning carriage along the second axis of movement,
    the connection mechanism furthermore comprising:
    a system for applying a predetermined force to the machining carriage along the second axis of movement,
    a unit for controlling the force applied to the machining carriage by an application system.

2. The machining center according to claim 1, wherein the control unit is configured to control the force applied to the machining carriage as a function of the desired contact pressure between the machining tool and the part.

3. The machining center according to claim 1, wherein the control unit is configured to control the force applied to the machining carriage as a function of the wear of the machining tool.

4. The machining center according to claim 3, wherein the control unit comprises means for determining the wear of the machining tool, having one or more of the following: a system for measuring the wear of the machining tool, and a plurality of prerecorded data representative of the wear of the machining tool as a function of its use.

5. The machining center according to any one of the preceding claim 1, wherein the connection mechanism is a sliding connection between the machining carriage and the positioning carriage, said sliding connection incorporating the system for applying a predetermined force.

6. The machining center according to any one of the preceding claim 1, wherein the connection mechanism is configured to allow an additional axial displacement along the second axis of movement for the application system to apply the predetermined force.

7. The machining center according to any one of the preceding claim 1, wherein the connection mechanism is a ball screw system comprising:
    a nut attached to the positioning carriage,
    a screw configured to engage with the nut, the machining carriage resting on the screw,
    a system for driving the screw in rotation so as to allow the screw and the machining carriage to move in translation with respect to the nut and to the positioning carriage.

8. The machining center according to claim 7, wherein the system for applying the predetermined force comprises the nut of the ball screw system, the nut comprising a connecting part configured to engage with the screw and an enclosure attached to the positioning carriage, the connecting part and the enclosure being configured to be moved with respect to one another along the second axis of movement so as to produce an additional axial displacement.

9. The machining center according to claim 8, wherein the enclosure forms a sealed chamber in which the connecting part is at least partially placed, the connecting part comprising a piston inside the chamber in such a way as to define two chamber portions on either side of the connecting part along the second axis of movement, and
    wherein the application system additionally comprises a force application circuit that is in fluidic communication with the two chamber portions and is configured to apply a predetermined force to the connecting part by means of a pressurized fluid circulating inside the force application circuit in order to move the connecting part in translation along the second axis of movement with respect to the enclosure.

10. The machining center according to claim 9, wherein:
    the connecting part comprises a body in which is formed a through-hole for the passage of the screw of the ball screw system, a wall of the hole forming a helical imprint configured to engage with the screw of the ball screw system, the connecting part additionally comprising an external flange configured to delimit the two portions of the chamber of the enclosure when the connecting part is disposed inside the enclosure, the enclosure forms a through-hole for the positioning of the connecting part and the passage of the screw of the ball screw system, the through-hole comprising a portion that extends transversely to the second axis of movement so as to form the chamber in which the external flange of the connecting part is disposed when the connecting part is disposed inside the enclosure.

11. The machining center according to any one of the preceding claim 1, wherein the control unit is pneumatic or hydraulic.

\* \* \* \* \*